US005959251A

United States Patent [19]

English et al.

[11] Patent Number: 5,959,251

[45] Date of Patent: Sep. 28, 1999

[54] POWER FILTER COVER APPARATUS AND METHOD

[75] Inventors: Susan I. English, Chicago; Daniel J. Lecinski, Arlington Heights; Joseph M. August, Elgin; Kenneth S. Laughlin, Arlington Heights, all of Ill.

[73] Assignee: 3COM Corp., Rolling Meadows, Ill.

[21] Appl. No.: 09/055,195

[22] Filed: Apr. 4, 1998

[51] Int. Cl.[6] ........ H02G 3/14

[52] U.S. Cl. ........ 174/66; 220/3.8

[58] Field of Search ........ 174/66; 220/3.8

[56] References Cited

U.S. PATENT DOCUMENTS

| | | | |
|---|---|---|---|
| 3,386,606 | 6/1968 | Pastrick | 174/50 X |
| 3,434,618 | 3/1969 | MacDonald | 220/241 |
| 4,023,697 | 5/1977 | Merrero | 220/3.92 X |
| 4,295,575 | 10/1981 | Flachbarth | 220/3.92 |
| 4,807,759 | 2/1989 | Castner | 220/4.02 |
| 4,896,784 | 1/1990 | Heath | 220/3.94 X |
| 5,180,074 | 1/1993 | Bowman et al. | 220/3.8 |
| 5,251,771 | 10/1993 | Hotsumi et al. | 220/241 X |
| 5,257,487 | 11/1993 | Bantz et al. | 220/3.8 X |
| 5,383,098 | 1/1995 | Ma et al. | 220/4.02 X |
| 5,703,329 | 12/1997 | Delone | 220/3.8 X |
| 5,804,765 | 9/1998 | Siemon et al. | 174/66 X |

*Primary Examiner*—Dean A. Reichard
*Attorney, Agent, or Firm*—Baniak Nicholas Pine & Gannon

[57] ABSTRACT

An apparatus and method for covering a power filter includes a mounting plate and a cover. The mounting plate includes a first side and a second side each including a flange retaining portion. The mounting plate also includes at least one filter opening formed therein for receiving a power filter. The cover includes a first side wall and a second side wall. A first flange portion having a length extends from each of the side walls. The first and second side walls each include a leg portion formed therein. The leg portion includes a second flange portion having a length greater than the length of the first flange portion wherein the first flange portion slides into the flange retaining portion and the second flange portion extends through a guide opening formed in the flange retaining portion and slides into the flange retaining portion while the leg portion is flexed inward.

19 Claims, 3 Drawing Sheets

POWER FILTER COVER APPARATUS AND METHOD

FIELD OF THE INVENTION

This invention relates generally to the field of protective covers, and in particular, to a protective cover for power filters mounted on a cabinet for housing electronic devices.

BACKGROUND OF THE INVENTION

Electronic modules, such as network access servers, are typically housed in a cabinet in a stacked configuration. Power terminals which include power filters are typically located at the top of the cabinet to supply power to the various modules within the cabinet.

Attempts have been made to provide an assembly for securing and covering these power filters. These assemblies often consist of several components which are typically fastened together by conventional fastening means, such as screws or bolts. The number of components that are required for these assemblies results in increased tooling and manufacturing costs. Moreover, the installation of these assemblies using conventional fastening means is labor intensive which results in increased installation costs.

Flexible mechanical latches have been used in an attempt overcome the disadvantages of using mechanical fasteners to fasten the components together. However, the tooling and manufacturing costs associated with flexible mechanical latches greatly increases the cost of the components. Also, plastic latches are susceptible to failure when forces are applied to them in operation.

Accordingly, it would be desirable to have a power filter cover apparatus that overcomes the disadvantages described above, and to provide a simple and cost effective power filter cover apparatus.

SUMMARY OF THE INVENTION

One aspect of the invention provides a power filter cover apparatus including a mounting plate and a cover. The mounting plate includes a first side and a second side each including a flange retaining portion. The mounting plate also includes at least one filter opening formed therein for receiving a power filter. The cover includes a first side wall and a second side wall. A first flange portion having a length extends from each of the side walls. The first and second side walls each include a leg portion formed therein. The leg portion includes a second flange portion having a length greater than the length of the first flange portion wherein the first flange portion slides into the flange retaining portion and the second flange portion extends through a guide opening formed in the flange retaining portion and slides into the flange retaining portion while the leg portion is flexed inward. The flange retaining portion may include at least one flange opening for receiving the second flange portion. At least one power filter may be received in the at least one filter opening formed in the mounting plate. A divider may extend substantially perpendicular from the mounting plate. The divider and the mounting plate may be formed as an integral member. An insulative cover may be secured to a first side and a second side of the divider. At least one alignment notch may be formed in an end of the mounting plate. A plurality of fastener openings may be formed in the mounting plate. The mounting plate may be formed from a single piece of metal and may have a rectangular shape. At least one locator tab may extend from an end wall of the cover. At least one cable opening may be formed in a second end wall of the cover. The cover may be formed from a single piece of insulative material and may have a rectangular shape.

Another aspect of the invention provides a method for covering a power filter. A mounting plate and a cover are provided. The mounting plate includes a first side and a second side each including a flange retaining portion. The mounting plate also includes at least one filter opening formed therein for receiving a power filter. The cover includes a first side wall and a second side wall. A first flange portion having a length extends from each of the side walls. The first and second side walls each include a leg portion formed therein. The leg portion includes a second flange portion having a length greater than the length of the first flange portion. The second flange portion is inserted into a guide opening formed in the flange retaining portion. The leg portion is flexed inward and the first and second flange portions are slid into the flange retaining portion to secure the cover to the mounting plate. A flange opening formed in the flange retaining portion may also be provided. The leg portion may be released and the second flange portion may be inserted into the flange opening. A power filter may also be provided. The power filter may be inserted into the at least one filter opening to secure the power filter to the mounting plate.

Another aspect of the invention provides a power filter cover apparatus including a cabinet for housing electronic devices having an outer wall. A cabinet opening is formed in the outer wall for receiving a power filter. A mounting plate is secured to the outer wall of the cabinet. The mounting plate includes a first side and a second side each including a flange retaining portion. The mounting plate also includes at least one filter opening formed therein for receiving the power filter. A cover includes a first side wall and a second side wall. a first flange portion having a length extends from each of the side walls. The first and second side walls each include a leg portion formed therein. The leg portion includes a second flange portion having a length greater than the length of the first flange portion wherein the first flange portion slides into the flange retaining portion and the second flange portion extends through a guide opening formed in the flange retaining portion and slides into the flange retaining portion while the leg portion is flexed inward. The outer wall of the cabinet may preferably be the top wall.

Another aspect of the invention provides a method for covering a power filter. A cabinet for housing electronic devices including an outer wall is provided. A cabinet opening is formed in the outer wall. A mounting plate includes a first side and a second side each including a flange retaining portion. The mounting plate includes at least one filter opening formed therein. A cover includes a first side wall and a second side wall. A first flange portion having a length extends from each of the side walls. The first and second side walls each include a leg portion formed therein. The leg portion includes a second flange portion having a length greater than the length of the first flange portion. The filter opening formed in the mounting plate is aligned with the cabinet opening. The mounting plate is secured to the outer wall of the cabinet. A power filter is inserted through the filter opening and the cabinet opening. The power filter is secured to the mounting plate. The second flange portion is inserted into a guide opening formed in the flange retaining portion. The leg portion is flexed inward and the first and second flange portions are slid into the flange retaining portion to secure the cover to the mounting plate.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which are defined by the appended claims and equivalents thereof.

DETAILED DESCRIPTION OF THE DRAWINGS

DETAILED DESCRIPTION OF THE PRESENTLY PREFERRED EMBODIMENTS

Figure 1:
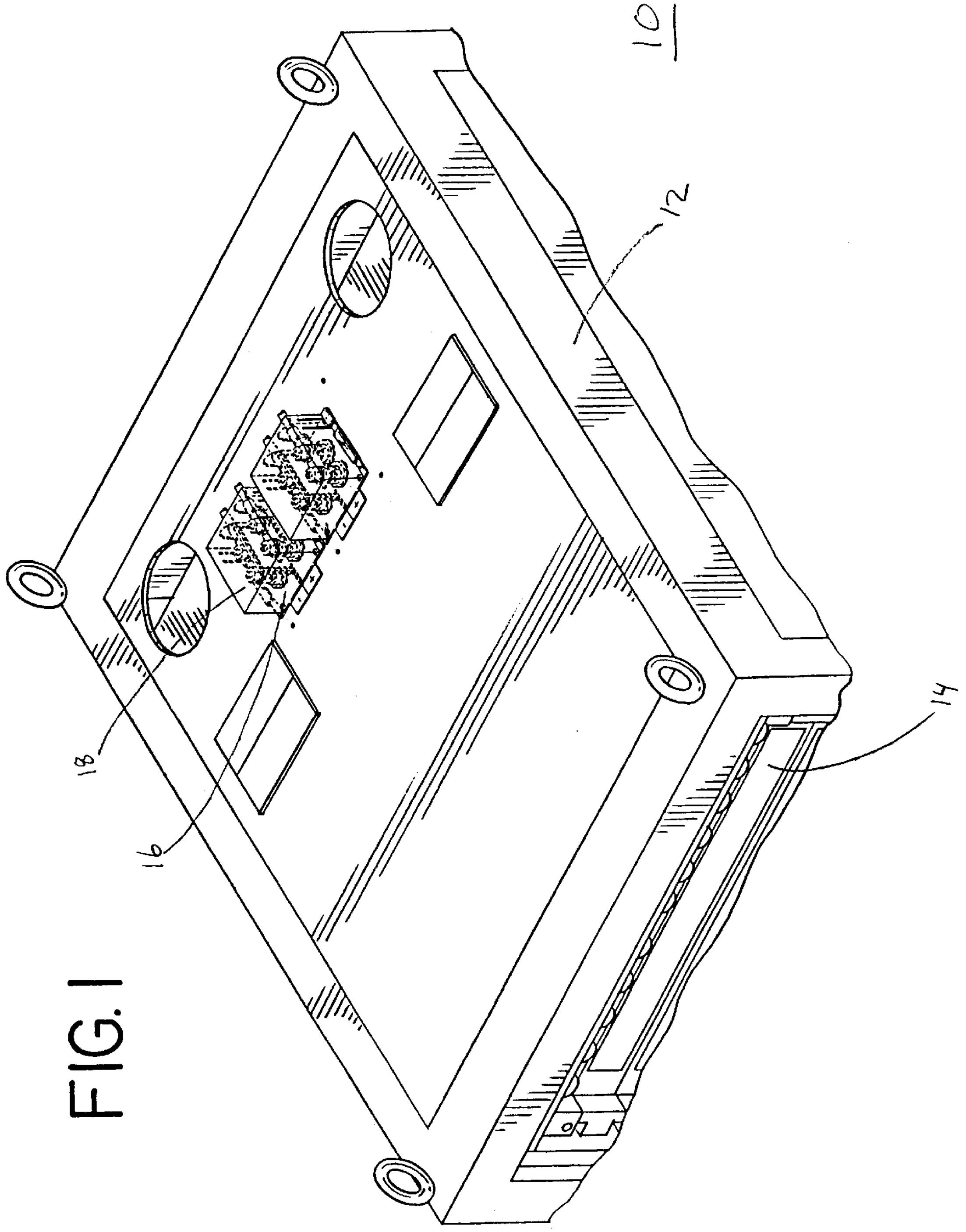
FIG. 1 is a partial perspective view of a preferred embodiment of a power filter cover apparatus mounted to the top surface of a cabinet for housing electronic modules.
Figure 2:
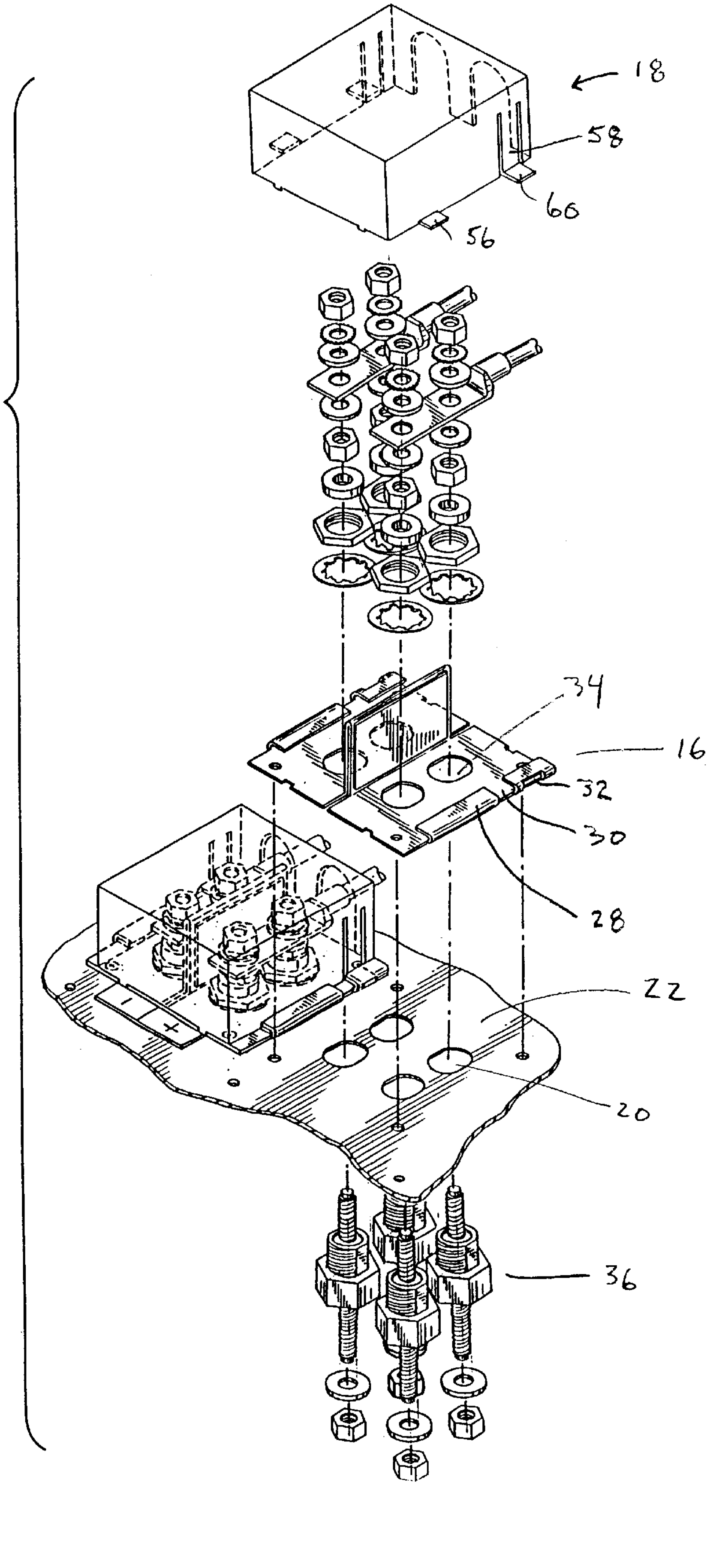
FIG. 2 is an exploded view of the power filter cover apparatus of FIG. 1.
Figure 3:
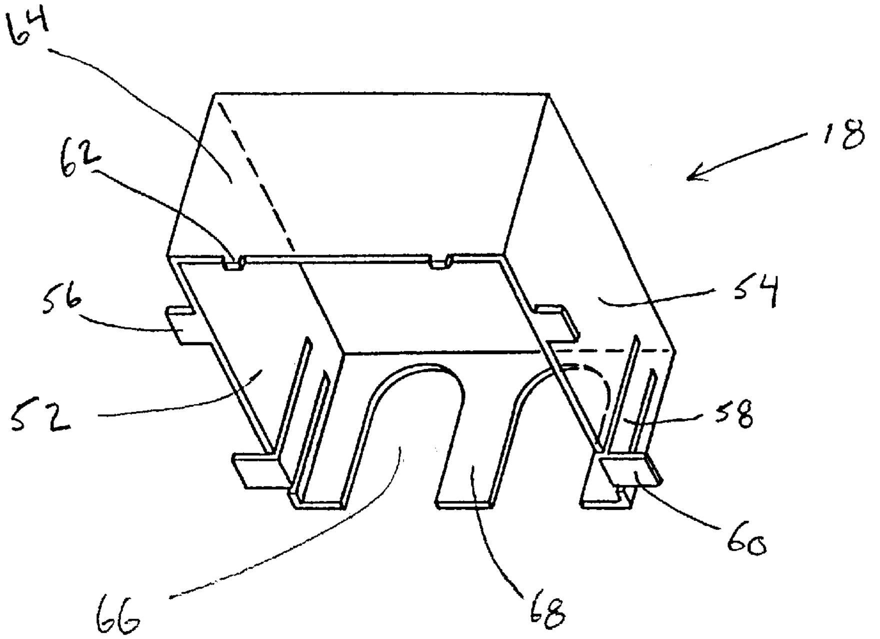
FIG. 3 is a perspective view of the cover.
Figure 4:
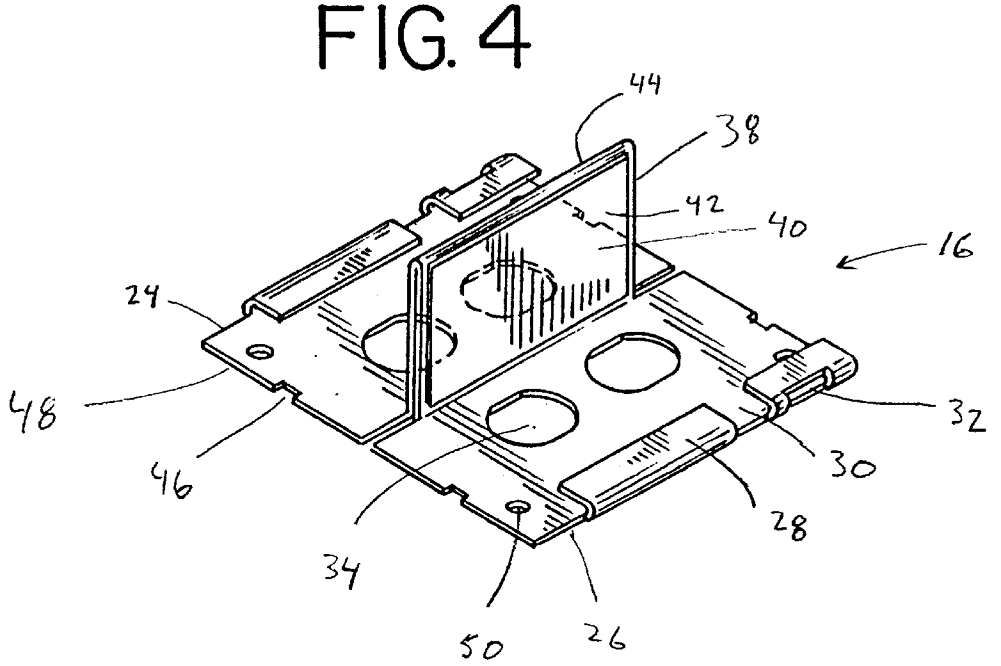
FIG. 4 is a perspective view of the mounting plate.
Figure 1:
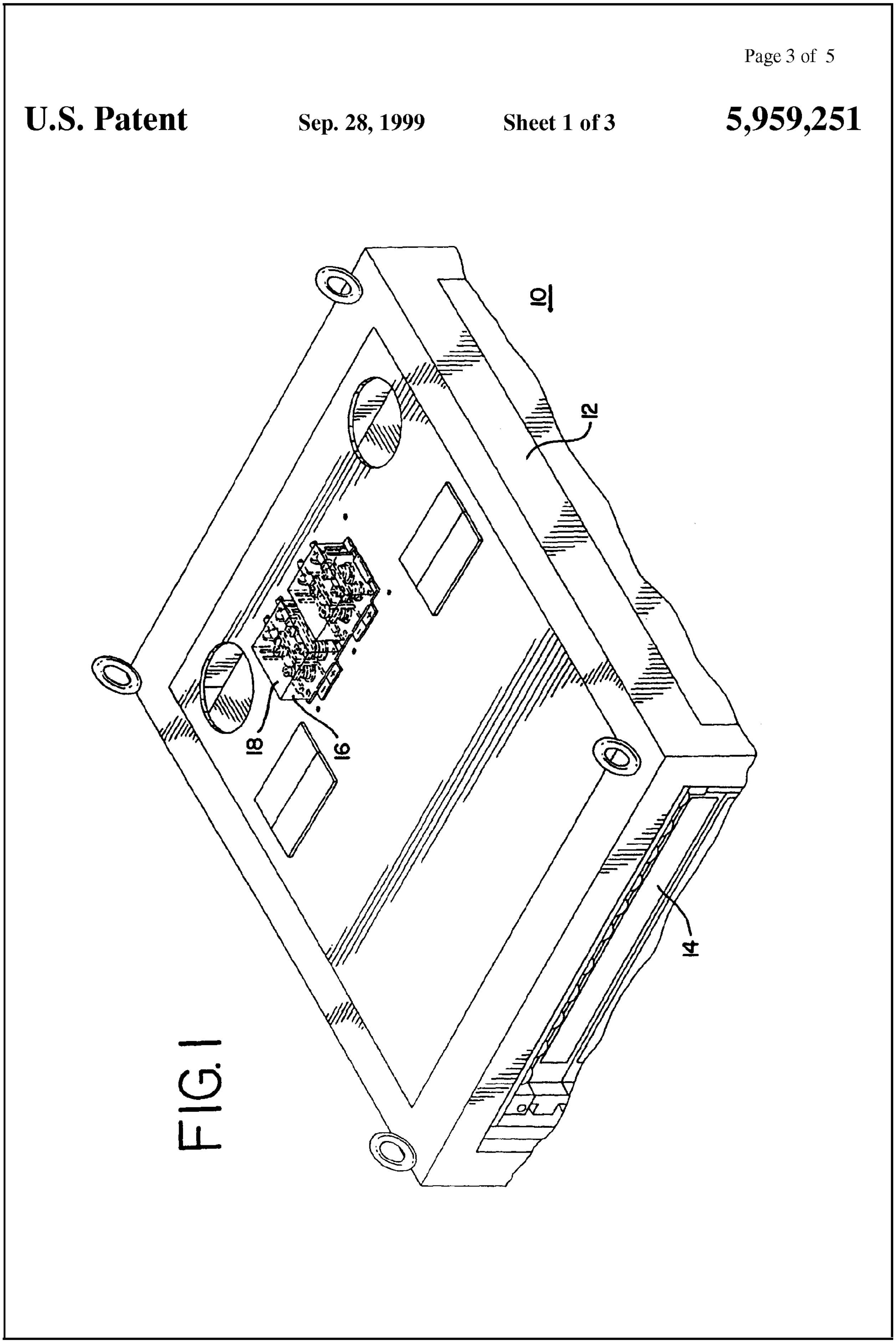
Figure 2:
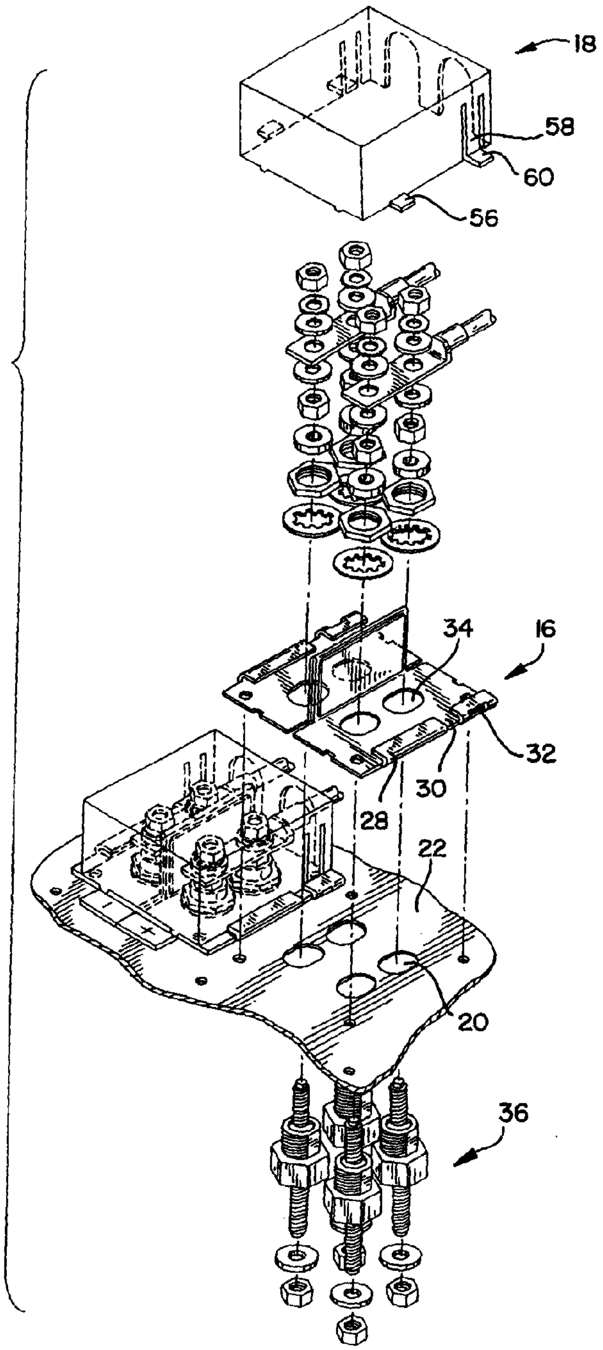
Figure 3:
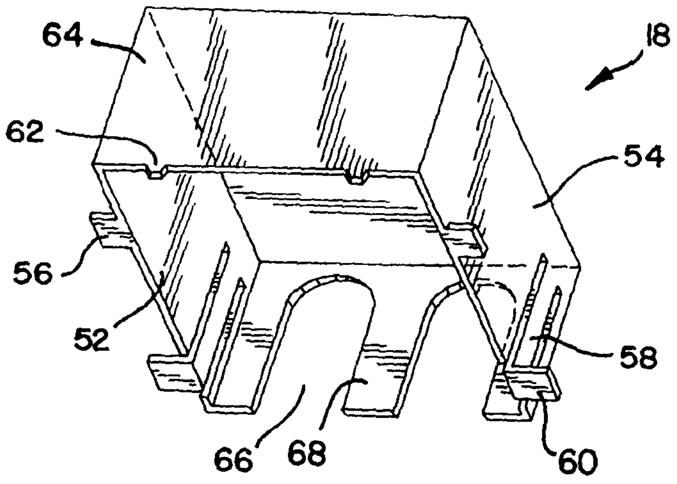
Figure 4:
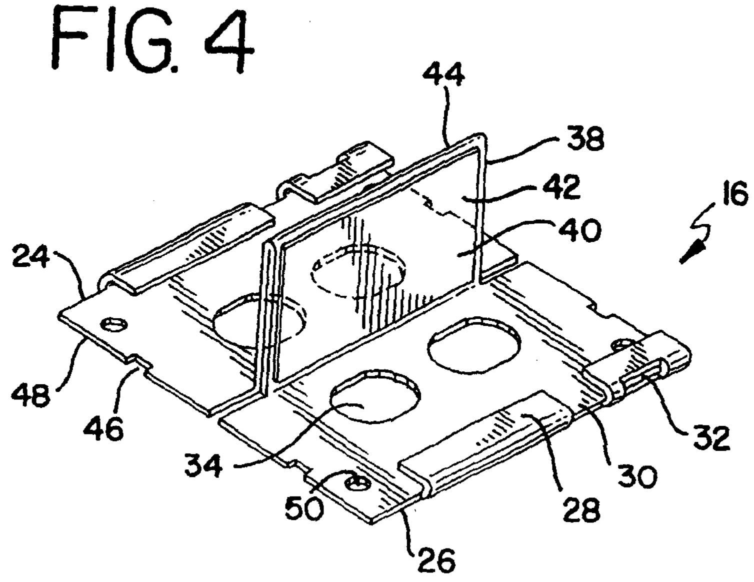

Referring to FIGS. 1–4, a preferred embodiment of a power filter cover apparatus 10 comprises a mounting plate 16 and a cover 18. As shown in FIG. 4, the mounting plate 16 includes a first side 24 and a second side 26. The first and second sides 24, 26 each include a flange retaining portion 28. The mounting plate 16 also includes at least one opening 34 for receiving a power filter 36. As shown in FIG. 3, the cover 18 includes a first side wall 52 and a second side wall 54. A first flange portion 56 having a length extends from each of the side walls 52, 54. In the embodiment shown, the first flange portion 56 extends substantially perpendicular from each of the side walls 52, 54. The first and second side walls 52, 54 each include a leg portion 58 formed therein. The leg portion 58 includes a second flange portion 60 having a length greater than the length of the first flange portion 56, wherein the first flange portion 56 slides into the flange retaining portion 28 and the second flange portion 60 extends through a guide opening 30 formed in the flange retaining portion 28 and slides into the flange retaining portion 28 while the leg portion 58 is flexed inward.

Referring to FIG. 1, the power filter cover apparatus 10 may also include a cabinet 12 for housing electronic modules 14. The cabinet 12 may be any of the commercially available cabinets suitable for housing electronic modules 14 such as, for example, an office router, a port expansion device, a managed modem pool device, an access concentrator, a redundant power device, a LAN switch, an edgeserver, and other types of electronic modules. As shown in FIG. 2, the cabinet 12 includes at least one opening 20 formed in an outer wall 22. In the embodiment shown, the outer wall 22 of the cabinet 12 is the top wall. The power filter 36 may be any of the commercially available power filters.

In the embodiment shown in FIG. 4, two guide openings 30 are formed in the flange retaining portion 28 of the mounting plate 16. The flange retaining portion 28 may also preferably include at least one flange opening 32. In the embodiment shown, two flange openings 32 are provided. A divider 38 may preferably extend substantially perpendicular from the mounting plate 16. The divider 38 may be a separate member which is attached to the mounting plate 16. Alternatively, the divider 38 and the mounting plate 16 may be formed as an integral member as shown in FIG. 4. An insulative covering 40 may preferably be secured to a first side 42 and a second side 44 of the divider 38. The insulative covering 40 may be comprised of any suitable insulative material such as, for example, plastic or rubber. At least one alignment notch 46 may preferably be formed in an end 48 of the mounting plate 16. As shown in FIG. 4, two alignment notches 46 are contemplated, although additional notches may be utilized.

A plurality of fastener openings 50 may preferably be formed in the mounting plate 16 for securing the mounting plate 16 to the cabinet 12. The mounting plate 16 may be formed from a single piece of conductive material such as, for example, metal. As shown on FIG. 4, the mounting plate 16 may have a rectangular shape. Alternatively, the mounting plate 16 may be any shape depending upon the particular application, and various configurations are contemplated.

Referring to FIG. 3, at least one locator tab 62 may preferably extend from an end wall 64 of the cover 18. In the embodiment shown, two locator tabs 62 are provided, although additional locator tabs 62 may be utilized depending on the particular application. When the cover 18 is slidably engaged with the mounting plate 16, the locator tab 62 is received into the alignment notch 46 of the mounting plate 16 so that the cover 18 is aligned with the mounting plate 16. At least one cable opening 66 may preferably be formed in a second end wall 68 of the cover 18. In the embodiment shown, two cable openings 66 are provided, although additional openings may be utilized.

As shown in FIG. 3, the cover 18 may preferably have a rectangular shape. Alternatively, the cover 18 may be any shape depending upon the particular application, and various configurations are contemplated. The cover 18 may preferably be formed from a single piece of insulative material such as, for example, plastic.

One advantage of the present invention is that the cover 18 can be easily secured to the mounting plate 16 by simply flexing the leg portion 58 inward, sliding the first and second flange portions 56, 60 into the flange retaining portion 28 (see FIG. 4), and releasing the leg portion 58 to allow the second flange portion 60 to be inserted into the flange opening 32 (see FIG. 4). Moreover, the invention provides substantial savings in tooling and manufacturing costs due to the fact only two pieces, the cover 18 and mounting plate 16, are required.

The power filter apparatus 10 may be used for covering a power filter 36. As shown in FIG. 2, the filter opening 34 formed in the mounting plate 16 may preferably be aligned with the cabinet opening 20. The mounting plate 16 may be secured to the top surface 22 of the cabinet 12. A power filter 36 may be inserted through the filter opening 34 and the cabinet opening 20. The power filter 36 may preferably be secured to the mounting plate 16 by any conventional mechanical fasteners which may include, for example, bolts, nuts, screws, etc. The second flange portion 60 is inserted into the guide opening 30 formed in the flange retaining portion 28. The leg portion 58 is flexed inward and the first and second flange portions 56, 60 are slid into the retaining portion 28. The leg portion 58 is released which allows the second flange portion 60 to be inserted into the flange opening 32.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A power filter cover apparatus comprising:

a mounting plate including a first side and a second side, the first and second sides each including a flange retaining portion, the mounting plate including at least one filter opening formed therein for receiving a power filter, a cover including a first side wall and a second side wall, a first flange portion having a length extending from each of the side walls, the first and second side walls each including a leg portion formed therein, the leg portion including a second flange portion, the second flange portion having a length greater than the length of the first flange portion wherein the first flange portion slides into the flange retaining portion and the second flange portion extends through a guide opening formed in the flange retaining portion and slides into the flange retaining portion while the leg portion is flexed inward.

2. The apparatus of claim 1 wherein the flange retaining portion includes at least one flange opening for receiving the second flange portion.

3. The apparatus of claim 1 further comprising a divider extending substantially perpendicular from the mounting plate.

4. The apparatus of claim 3 wherein the divider and the mounting plate are formed as an integral member.

5. The apparatus of claim 3 further comprising an insulative covering secured to a first side and a second side of the divider.

6. The apparatus of claim 1 further comprising at least one alignment notch formed in an end of the mounting plate.

7. The apparatus of claim 1 further comprising a plurality of fastener openings formed in the mounting plate.

8. The apparatus of claim 1 wherein the mounting plate is formed from a single piece of metal.

9. The apparatus of claim 1 wherein the mounting plate has a rectangular shape.

10. The apparatus of claim 1 further comprising at least one locator tab extending from an end wall of the cover.

11. The apparatus of claim 1 further comprising at least one cable opening formed in a second end wall of the cover.

12. The apparatus of claim 1 wherein the cover is formed from a single piece of insulative material.

13. The apparatus of claim 1 wherein the cover has a rectangular shape.

14. A method for covering a power filter comprising:

providing a cabinet for housing electronic devices including an outer wall, a cabinet opening formed in the outer wall, a mounting plate including a first side and a second side, the first and second sides each including a flange retaining portion, the mounting plate including at least one filter opening formed therein, and a cover including a first side wall and a second side wall, a first flange portion having a length extending from each of the side walls, the first and second side walls each including a leg portion formed therein, the leg portion including a second flange portion, the second flange portion having a length greater than the length of the first flange portion;

aligning the filter opening formed in the mounting plate with the cabinet opening;

securing the mounting plate to the outer wall of the cabinet;

inserting a power filter through the filter opening and the cabinet opening;

securing the power filter to the mounting plate;

inserting the second flange portion into a guide opening formed in the flange retaining portion;

flexing the leg portion inward;

sliding the first and second flange portions into the retaining portion; and, securing the cover to the mounting plate.

15. A method for covering a power filter comprising:

providing a mounting plate including a first side and a second side, the first and second sides each including a flange retaining portion, the mounting plate including at least one filter opening formed therein;

a cover including a first side wall and a second side wall, a first flange portion having a length extending from each of the side walls, the first and second side walls each including a leg portion formed therein, the leg portion including a second flange portion, the second flange portion having a length greater than the length of the first flange portion;

inserting the second flange portion into a guide opening formed in the flange retaining portion;

flexing the leg portion inward;

sliding the first and second flange portions into the flange retaining portion; and, securing the cover to the mounting plate.

16. The method of claim 15 further comprising:

providing a flange opening formed in the flange retaining portion;

releasing the leg portion; and, inserting the second flange portion into the flange opening.

17. The method of claim 15 further comprising;

providing a power filter;

inserting the power filter into the at least one filter opening; and, securing the power filter to the mounting plate.

18. A power filter cover apparatus comprising:

a cabinet for housing electronic devices including an outer wall, a cabinet opening formed in the outer wall for receiving a power filter, a mounting plate secured to the outer wall of the cabinet, the mounting plate including a first side and a second side, the first and second sides each including a flange retaining portion, the mounting plate including at least one filter opening formed therein for receiving a power filter, and a cover including a first side wall and a second side wall, a first flange portion having a length extending from each of the side walls, the first and second side walls each including a leg portion formed therein, the leg portion including a second flange portion, the second flange portion having a length greater than the length of the first flange portion wherein the first flange portion slides into the flange retaining portion and the second flange portion extends through a guide opening formed in the flange retaining portion and slides into the flange retaining portion while the leg portion is flexed inward.

19. The apparatus of claim 18 wherein the outer wall of the cabinet is a top wall.

* * * * *

UNITED STATES PATENT AND TRADEMARK OFFICE

CERTIFICATE OF CORRECTION

PATENT NO. : 5,959,251 
DATED : Sptember 28, 1999
INVENTOR(S) : Susan I. English, Daniel J. Lecinski, Joseph M. August and Kenneth S. Laughlin It is certified that error appears in the above-identified patent and that said Letters Patent is hereby corrected as shown below:

Title page,
Should be deleted to be replaced with attached title page.
Filed Item [22], please change "April 4, 1998" -- April 3, 1998 --.

Drawings,
The drawing sheets, consisting of Figs. 1-4, should be deleted and replaced with the drawing sheets, consisting of Figs. 1-4, as shown on the attached pages.

Signed and Sealed this

Ninth Day of July, 2002

Attest:

JAMES E. ROGAN

*Attesting Officer* *Director of the United States Patent and Trademark Office*

United States Patent [19]
English et al.

[11] Patent Number: 5,959,251
[45] Date of Patent: Sep. 28, 1999

[54] POWER FILTER COVER APPARATUS AND METHOD

[75] Inventors: Susan I. English, Chicago; Daniel J. Lecinski, Arlington Heights; Joseph M. August, Elgin; Kenneth S. Laughlin, Arlington Heights, all of Ill.

[73] Assignee: 3COM Corp., Rolling Meadows, Ill.

[21] Appl. No.: 09/055,195

[22] Filed: Apr. 4, 1998

[51] Int. Cl.[6] ..................................................... H02G 3/14
[52] U.S. Cl. ............................................. 174/66; 220/3.8
[58] Field of Search ................................ 174/66; 220/3.8

[56] References Cited

U.S. PATENT DOCUMENTS

| | | | |
|---|---|---|---|
| 3,386,606 | 6/1968 | Pastrick | 174/50 X |
| 3,434,618 | 3/1969 | MacDonald | 220/241 |
| 4,023,697 | 5/1977 | Merrero | 220/3.92 X |
| 4,295,575 | 10/1981 | Flachbarth | 220/3.92 |
| 4,807,759 | 2/1989 | Castner | 220/4.02 |
| 4,896,784 | 1/1990 | Heath | 220/3.94 X |
| 5,180,074 | 1/1993 | Bowman et al. | 220/3.8 |
| 5,251,771 | 10/1993 | Hotsumi et al. | 220/241 X |
| 5,257,487 | 11/1993 | Bantz et al. | 220/3.8 X |
| 5,383,098 | 1/1995 | Ma et al. | 220/4.02 X |
| 5,703,329 | 12/1997 | Delone | 220/3.8 X |
| 5,804,765 | 9/1998 | Siemon et al. | 174/66 X |

*Primary Examiner*—Dean A. Reichard
*Attorney, Agent, or Firm*—Baniak Nicholas Pine & Gannon

[57] ABSTRACT

An apparatus and method for covering a power filter includes a mounting plate and a cover. The mounting plate includes a first side and a second side each including a flange retaining portion. The mounting plate also includes at least one filter opening formed therein for receiving a power filter. The cover includes a first side wall and a second side wall. A first flange portion having a length extends from each of the side walls. The first and second side walls each include a leg portion formed therein. The leg portion includes a second flange portion having a length greater than the length of the first flange portion wherein the first flange portion slides into the flange retaining portion and the second flange portion extends through a guide opening formed in the flange retaining portion and slides into the flange retaining portion while the leg portion is flexed inward.

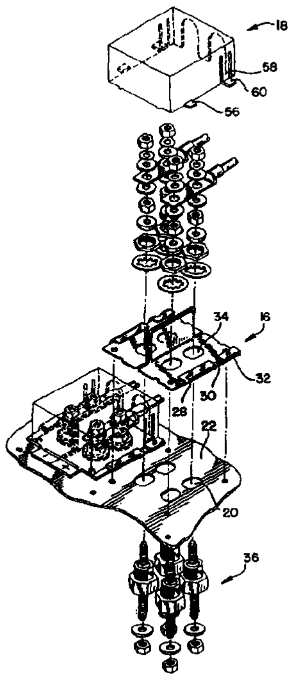

19 Claims, 3 Drawing Sheets